(12) United States Patent
Nishikawa

(10) Patent No.: US 7,746,672 B2
(45) Date of Patent: Jun. 29, 2010

(54) SWITCHING POWER SUPPLY APPARATUS

(75) Inventor: Yukihiro Nishikawa, Hino (JP)

(73) Assignee: Fuji Electric Device Technology Co., Ltd. (JP)

( * ) Notice: Subject to any disclaimer, the term of this patent is extended or adjusted under 35 U.S.C. 154(b) by 186 days.

(21) Appl. No.: 12/143,744

(22) Filed: Jun. 20, 2008

(65) Prior Publication Data
US 2009/0010027 A1 Jan. 8, 2009

(30) Foreign Application Priority Data
Jul. 2, 2007   (JP)   ............... 2007-173957

(51) Int. Cl.
*H02M 3/335* (2006.01)
(52) U.S. Cl. .............. 363/21.16; 363/21.07; 363/21.08; 363/21.15
(58) Field of Classification Search ............. 363/20, 363/21.01, 21.04, 21.07, 21.08, 21.09, 21.1, 363/21.11, 21.12, 21.15, 21.16, 21.17, 21.18, 363/97, 131
See application file for complete search history.

(56) References Cited

U.S. PATENT DOCUMENTS

| 6,356,466 B1* | 3/2002 | Smidt et al. ............. 363/21.17 |
| 6,529,391 B2* | 3/2003 | Yoshinaga et al. ....... 363/21.15 |
| 6,903,945 B2 | 6/2005 | Kitano |
| 7,259,973 B2* | 8/2007 | Yamashita ............... 363/21.16 |
| 7,414,865 B2* | 8/2008 | Yang ....................... 363/21.16 |

FOREIGN PATENT DOCUMENTS

| JP | 2000-270546 A | 9/2000 |
| JP | 2002-136125 A | 5/2002 |
| JP | 2004-88959 A  | 3/2004 |

* cited by examiner

*Primary Examiner*—Gary L Laxton
(74) *Attorney, Agent, or Firm*—Rossi, Kimms & McDowell LLP

(57) ABSTRACT

A switching power supply apparatus which includes a DC power supply, an isolation transformer having primary, secondary and tertiary windings, and a switching element, and in which, by turning the switching element on and off, the high-frequency voltage appearing in the secondary windings of the isolation transformer is rectified to obtain a DC output, power consumption can be decreased during standby (in burst mode) in particular by means of a control circuit which controls the turn-on and turn-off of the element and similar.

15 Claims, 11 Drawing Sheets

CASE IN WHICH CARRIER SIGNAL INCLINATION IS CONSTANT CARRIER SIGNAL

CASE IN WHICH CARRIER SIGNAL INCLINATION IS CHANGED

SWITCHING POWER SUPPLY APPARATUS

CROSS-REFERENCE TO RELATED APPLICATION

This application is based on, and claims priority from, Japanese Patent Application JP 2007-173957 filed Jul. 2, 2007, the contents of which are incorporated herein by reference.

BACKGROUND

This invention relates to a switching power supply apparatus which obtains an insulated DC output from a DC power supply, and in particular relates to a switching power supply apparatus which is capable of reducing the power consumption during standby.

In recent years efforts have been made to reduce the power consumption of electrical equipment, as a measure to alleviate global warming. In particular, there have been numerous proposals of inventions relating to switching power supply apparatuses provided with a standby mode, to supply only the minimum necessary electric power to devices, so as to reduce the power consumed when electrical equipment is not being used (see Japanese Patent Laid-open No. 2002-136125 and Japanese Patent Laid-open No. 2004-088959 (corresponding U.S. Pat. No. 6,903,945, corresponding China Patent CN 1311618C). FIG. 10 shows an example of a switching power supply apparatus having a configuration similar to those of the apparatuses disclosed in Japanese Patent Laid-open No. 2002-136125 and Japanese Patent Laid-open No. 2004-088959 (corresponding U.S. Pat. No. 6,903,945, corresponding China Patent CN 1311618C). The operation is explained referring to FIG. 11.

In standby mode, a comparator 6h compares the feedback signal VFB of the DC output voltage with threshold values Vth(H) and Vth(L), set in advance, and transmits a signal VCMP to a logic circuit 6a such that during intervals in which the feedback signal VFB is below the threshold value Vth(L), the on/off operation of the switching element 2 is stopped, and during intervals in which the feedback signal VFB is above the threshold value Vth(H), the switching element 2 is turned on and off. As a result, through intermittent application of a gate voltage VGS to the switching element 2, the number of switching operations per unit time is reduced and power consumption is reduced, in so-called burst oscillation control.

The power supply VCC for the control circuit 6 is obtained by rectifying and smoothing the voltage generated by auxiliary windings 3b provided in the isolation transformer 3; but because power is not supplied to the control circuit 6 during intervals in which switching element 2 on/off operation is halted, the power supply voltage VCC of the control circuit 6 drops depending on power consumption of the control circuit 6. If during this period the DC output voltage falls between the preset voltage, and the feedback voltage VFB exceeds the threshold value Vth(H), switching element 2 on/off operation is resumed, so that the DC output voltage rises and the power supply voltage VCC of the control circuit 6 also rises, and burst oscillation operation is continued.

FIG. 12 is another example of a switching power supply apparatus, with a configuration similar to that disclosed in Japanese Patent Laid-open No. 2000-270546. In the circuit of FIG. 12, when in standby mode, by turning the switch 17 off by means of a control signal cont1 and switching the power supply of the microcomputer 15 to power from the secondary windings 3c of the isolation transformer 3, current is no longer supplied to the photodiode 8a, and the phototransistor 8b turns off. As a result, the supply of power from the auxiliary windings 3b of the isolation transformer 3 to the control circuit 6 is halted, and so power is supplied to the control circuit 6 from the startup circuit 6g.

At this time the capacitor 5 connected to the power supply of the control circuit 6 is charged, and when the power supply voltage VCC rises to a prescribed voltage, the timer circuit 6d again halts the supply of power from the startup circuit 6g. Then, the voltage across the capacitor 5 falls due to consumption of power by the control circuit 6. When the power supply voltage VCC falls to a prescribed voltage, the timer circuit 6d again starts the supply of power from the startup circuit 6g. By means of this operation, the power supply voltage VCC of the control circuit assumes a triangular wave shape which rises and falls with a prescribed voltage amplitude. The timer circuit 6d counts these triangular-wave periods, and for example controls the logic circuit 6a every two periods to apply the output of the pulse width modulation (PWM) circuit 6b to the switching element 2. Burst oscillation operation is continued by employing the discharge interval of the capacitor 5, that is, the falling interval of the triangular wave, as the period for controlling the switching element 2.

In FIG. 10, a smoothing capacitor 5 with a large static capacitance is connected such that, under conditions in which the DC output power falls below the power consumption of the control circuit 6, such as for example with no load present, the control power supply voltage VCC falls during the interval in which the level of the feedback signal VFB is lower than the threshold value Vth(H), and does not fall below the minimum operating voltage Vuv of the control circuit 6. A capacitor with a large static capacitance is physically large, and so impedes efforts to reduce the size of the switching power apparatus, and also leads to cost increases.

Further, in the circuit of FIG. 12, the power consumption of the startup circuit is the product of the voltage difference between the voltage of the DC power supply 1 and the control power supply voltage VCC, and the current flowing in the startup circuit, and tends to cause an increase in the standby power consumption. Moreover, there is also the problem that when the power supplied to the microcomputer 15 is switched by the switch 17, voltage fluctuations occur at the instant of switching, so that erroneous operation of the microcomputer 15 or similar may occur. Also, when the switching element 2 begins switching, the voltage on capacitor CS gradually rises and the pulse width of the switching element 2 gradually broadens in soft-start operation, so that sharp changes in the current flowing in the isolation transformer 3 are suppressed, and audible sounds generated by the isolation transformer 3 are reduced. However, when the switching element 2 halts oscillation, there is a sudden change from a state in which current is flowing in the isolation transformer 3 to a state in which no current flows, and so there is the problem that there is less effect in decreasing audible noise.

Hence, it would be desirable to reduce the static capacitance of the smoothing capacitor connected to the control circuit, enabling use of a small and low-cost smoothing capacitor, to reduce power consumption, and to reduce audible noises generated by the transformer.

SUMMARY OF THE INVENTION

A switching power supply apparatus is provided that includes a DC power supply, an isolation transformer having primary, secondary and tertiary windings, and a switching element, and in which by turning on and off the switching element the high-frequency voltage appearing in the secondary windings of the isolation transformer is rectified to obtain a DC output, and is characterized in that voltage-stabilizing mechanism connected to the DC output, and control mechanism which executes on/off control of the switching element using as a control voltage the voltage obtained by rectifying and smoothing the voltage appearing in the tertiary windings of the isolation transformer, are provided. The control mechanism preferably includes a first control mechanism, which compares the magnitudes of a feedback signal which holds the output voltage constant and a carrier signal, and controls the on-time of the switching element, second control mechanism which controls the control power supply voltage, and operation mode switching mechanism which selects either the first control mechanism or the second control mechanism according to the load state of the DC output, and the second control mechanism is provided with at least one comparison mechanism which compares the control voltage with a first threshold value and a second threshold value. When the control voltage falls below the first threshold value, a switching-enabled signal is output to enable on/off control of the switching element, but when the control voltage rises above the second threshold value, a switching-prohibited signal is output to turn off the switching element.

Further, a switching power supply apparatus is provided that includes a DC power supply, an isolation transformer having primary, secondary and tertiary windings, and switching elements, and in which by connecting two switching elements in series with each other and in parallel with the DC power supply, and by turning on and off the two switching elements in alternation, the high-frequency voltage appearing in the secondary windings of the isolation transformer is rectified to obtain a DC output, and is characterized in that voltage-stabilizing mechanism connected to the DC output, and control mechanism which executes on/off control of the switching elements using as a control voltage the voltage obtained by rectifying and smoothing the voltage appearing in the tertiary windings of the isolation transformer, are provided. The control mechanism comprises first control mechanism, which compares the magnitudes of a feedback signal which holds the output voltage constant and a carrier signal, and controls the on-time of the switching elements, second control mechanism which controls the control voltage, and operation mode switching mechanism which selects either the first control mechanism or the second control mechanism according to the load state of the DC output, and the second control mechanism is provided with at least one comparison mechanism which compares the control voltage with a first threshold value and a second threshold value. When the control voltage falls below the first threshold value, a switching-enabled signal is output to enable on/off control of the switching elements, but when the control voltage rises above the second threshold value, a switching-prohibited signal is output to turn off the switching elements.

The first threshold value can be set higher than the minimum operating voltage of the control mechanism; further, the control mechanism can include a charging mechanism to raise the control power supply voltage, and the charging interval of this charging mechanism can be controlled through detection signals for a prescribed charging-halt voltage and charging-resume voltage, and the first threshold value can be set higher than the charging-resume voltage. Also, it would be desirable to provide an apparatus in which the second threshold value can be set such that the DC output is lower than the output voltage setting voltage.

The second control mechanism can include a capacitor and charging/discharging mechanism which charges the capacitor at a constant current with the timing of output of the switching-enabled signal, and which discharges the capacitor at a constant current with the timing of output of the switching-enabled signal, and the voltage value of the capacitor can be used as a turn-on pulse width value for the switching element the inclination of the carrier signal set in the first control mechanism can be changed according to the voltage value of the capacitor of the second control mechanism; and, by maintaining the capacitor of the second control mechanism in a fully-charged state, the first control mechanism can be made to operate preferentially.

The invention provides an apparatus in which power consumption during standby can be reduced, while supplying stabilized power to a microcomputer. Further, power consumption during standby can be reduced, without causing the control power supply voltage to fall below the minimum operating voltage. Still further, audible sounds generated by the isolation transformer and specific to burst oscillation can be reduced, and by use of the present apparatus control circuit can be simplified. Power supplied to the microcomputer can also be further stabilized.

BRIEF DESCRIPTION OF THE DRAWINGS

The invention has been described with reference to certain preferred embodiments thereof and the accompanying drawings, wherein.

DESCRIPTION OF THE PREFERRED EMBODIMENTS

Figure 1:
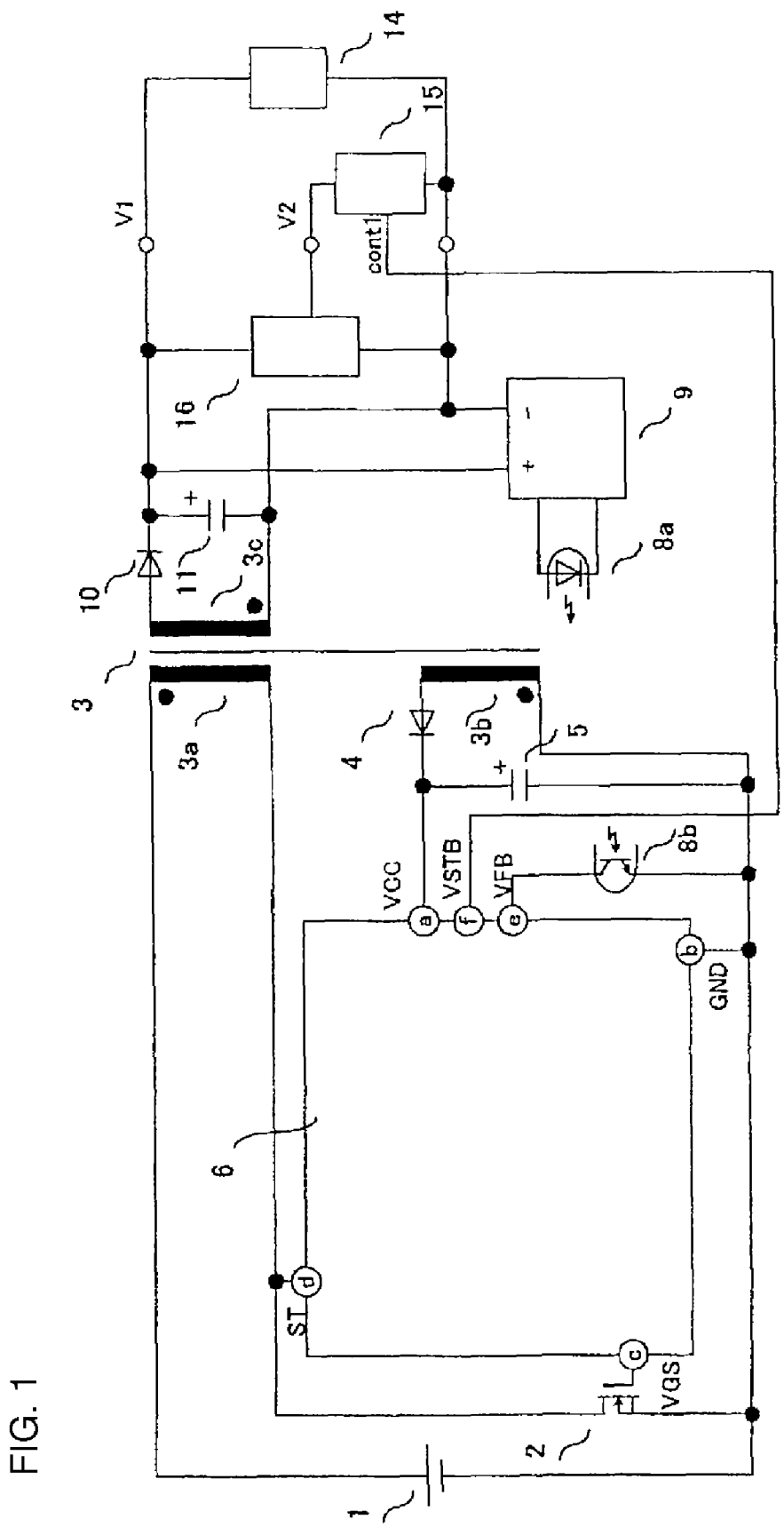
FIG. 1 shows the circuit configuration of an aspect of the invention.
Figure 10:
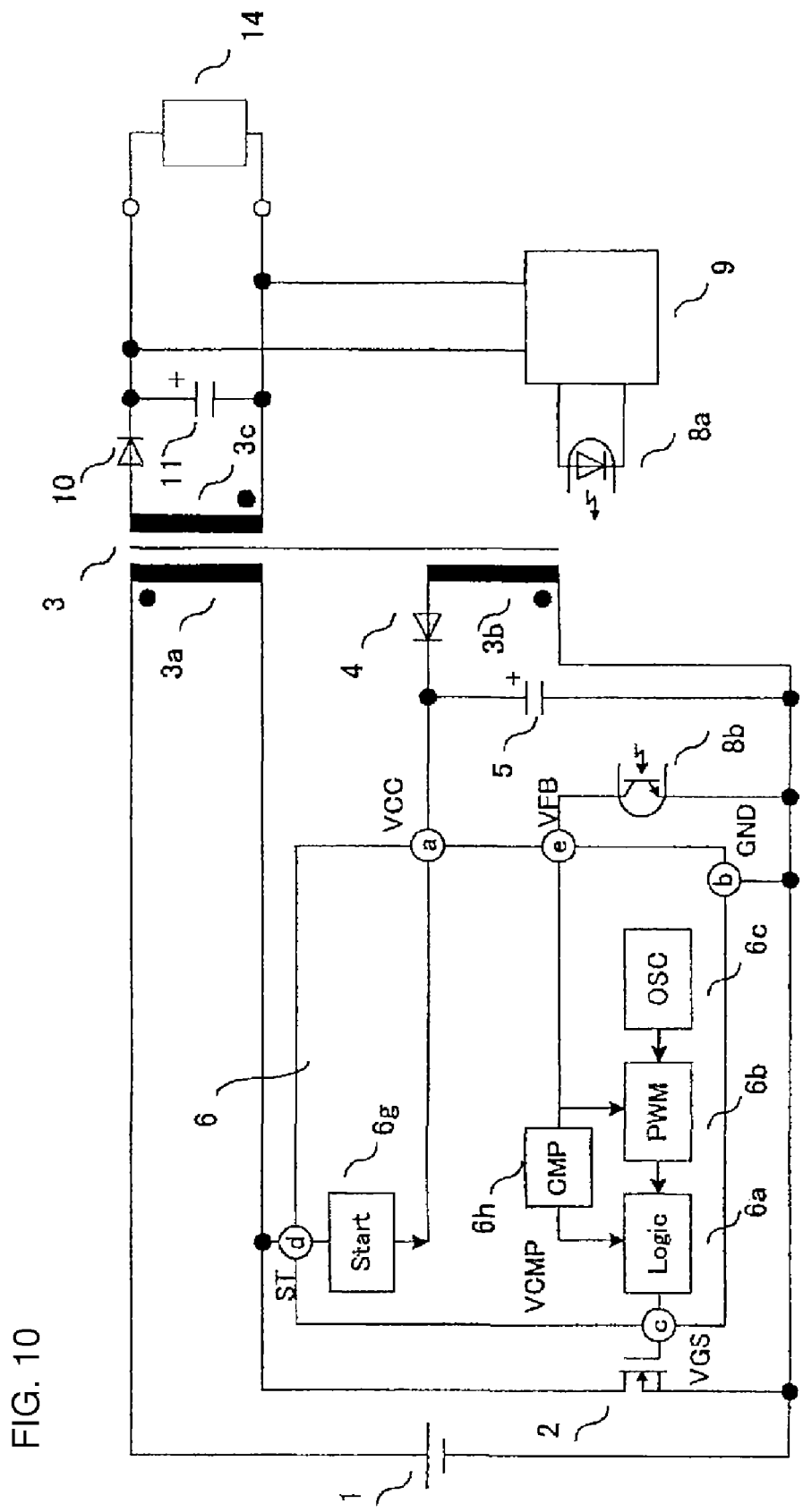
FIG. 10 shows the circuit configuration of a first example of the prior art.
Figure 11:
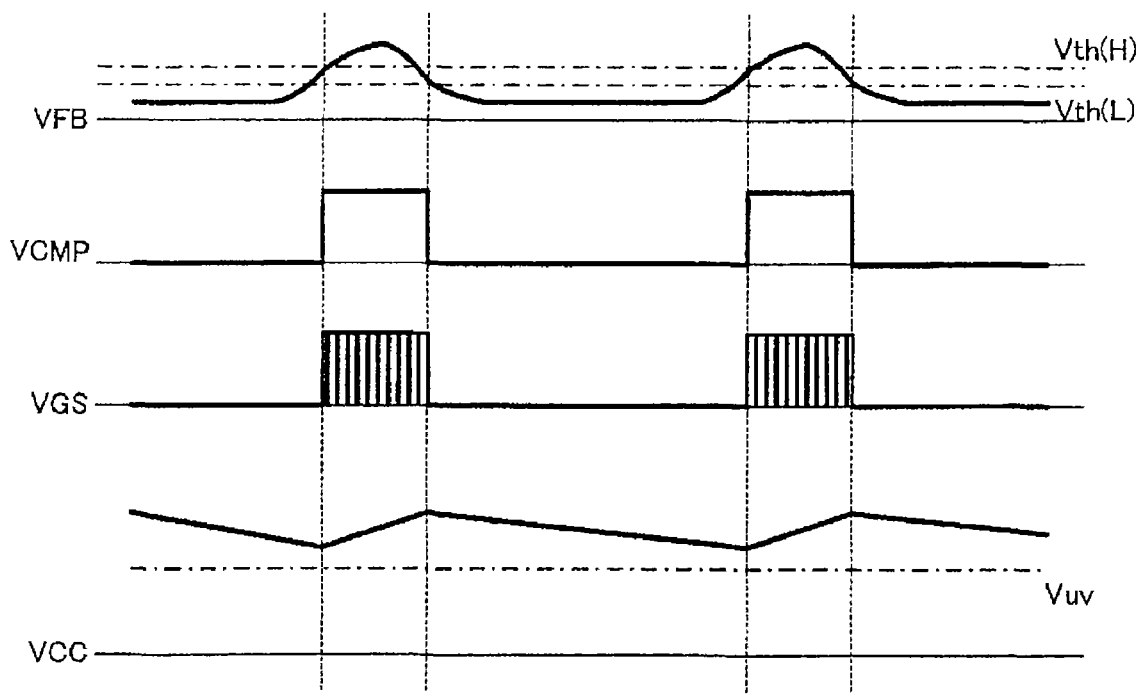
FIG. 11 explains operation in FIG. 10.

FIG. 1 shows the circuit configuration of a switching power supply apparatus which represents an aspect of the first embodiment. As shown in the figure, characteristics of this apparatus are the introduction of a switching signal cont1 from the microcomputer 15 into the control circuit 6, and the provision of voltage stabilizing mechanism 16 to stabilize the voltage input to the microcomputer 15; otherwise the configuration is similar to those of FIG. 10 and FIG. 12. As the voltage stabilizing mechanism 16, for example, a chopper control power supply or series regular power supply, or another well-known device, can be used, and the details thereof are omitted.

The switching signal cont1 from the microcomputer 15 is insulated from the primary side of the transformer by a photocoupler or other means. A similar configuration is employed in each of the following aspects.

Figure 2:
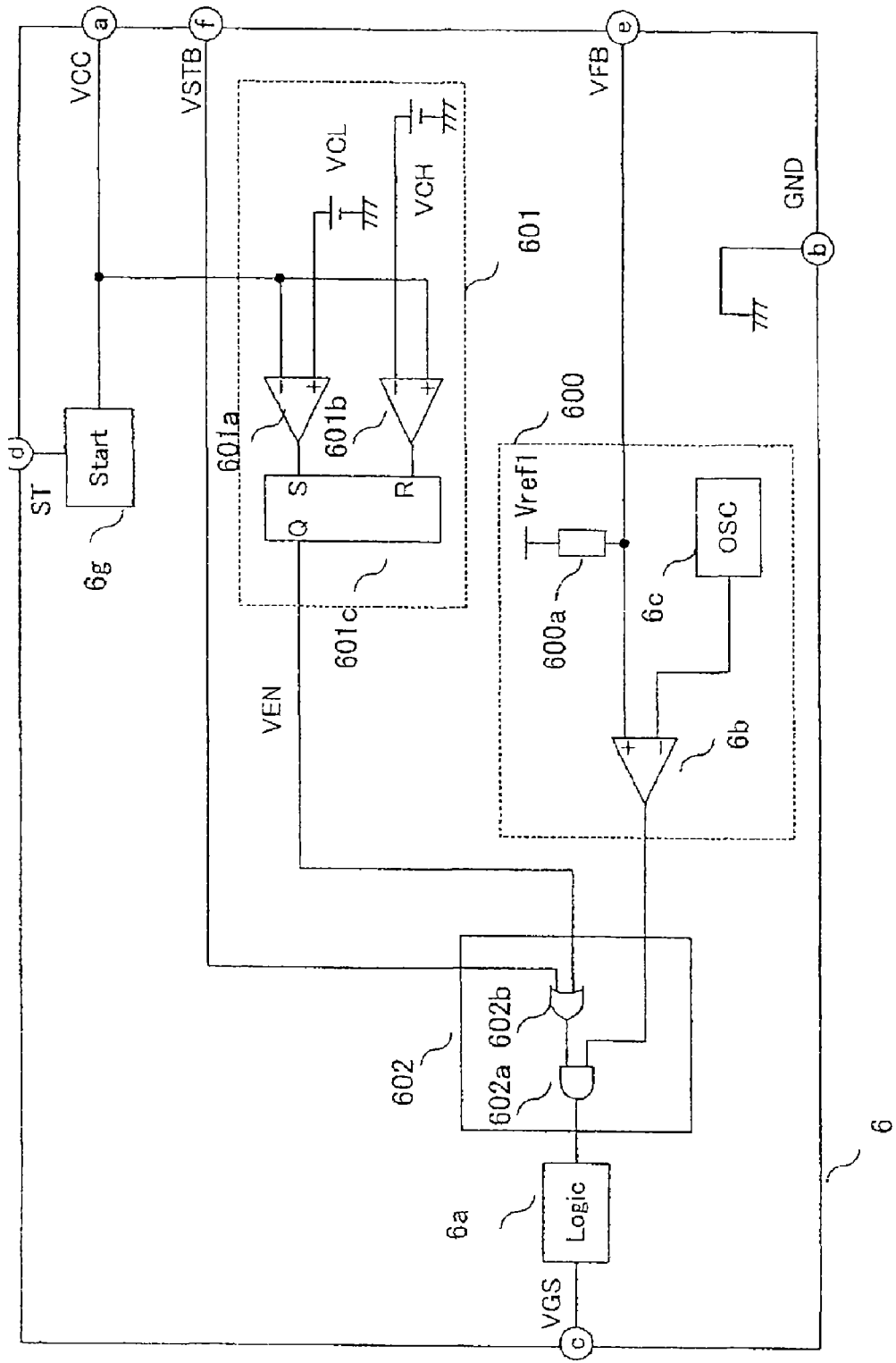
FIG. 2 is a circuit diagram showing a specific example of the control circuit of FIG. 1.

FIG. 2 is a circuit configuration diagram showing a specific example of a control circuit, and in summary comprises first control mechanism 600, comprising a resistance 600a, comparator 6b and carrier signal generation mechanism 6c; second control mechanism 601, comprising comparators 601a, 601b and a flip-flop 601c; and switching mechanism 602, comprising an AND gate 602a and an OR gate 602b. Also, 6a is a logic circuit, and 6g is a startup circuit.

A more detailed explanation is as follows. The first control mechanism 600 compares the magnitudes of a feedback signal VFB, used for control to hold the output voltage constant, and a carrier signal output from the carrier generation mechanism 6c, controls the turn-on time of the switching element 2. The second control mechanism 601 controls the control power supply voltage VCC, and the switching mechanism 602 selects either the first control mechanism 600 or the second control mechanism 601, according to the load state.

Figure 3:
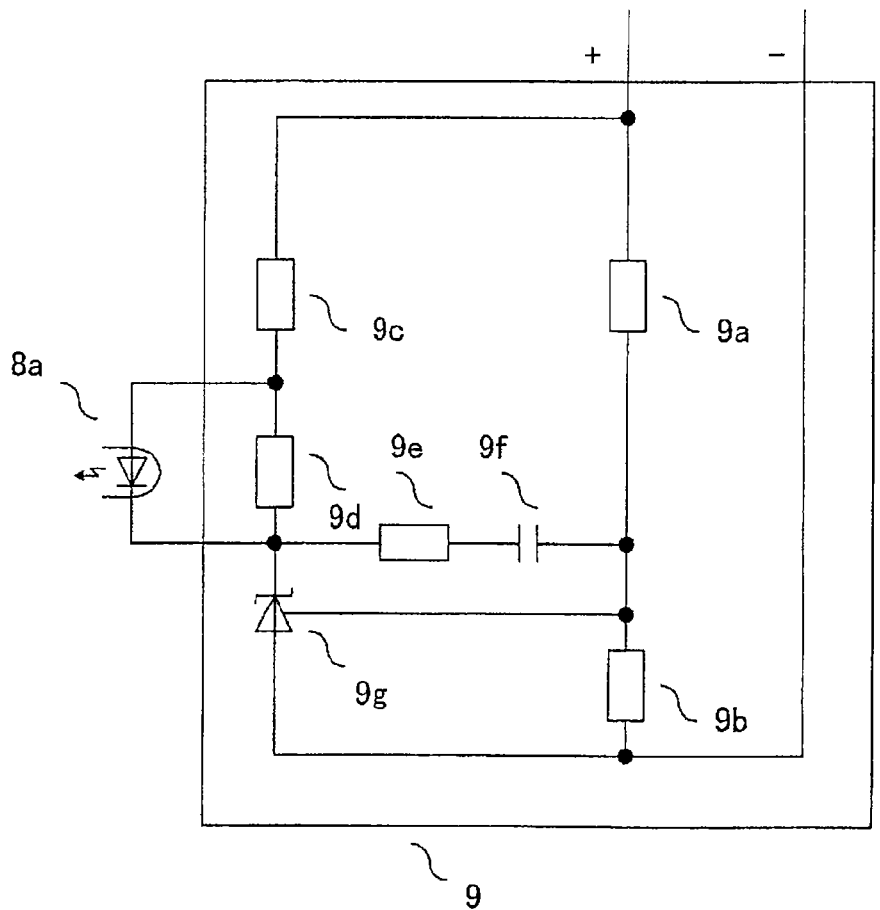
FIG. 3 is a circuit diagram showing a specific example of the output voltage adjustment circuit of FIG. 1.

FIG. 3 is a circuit diagram showing a specific example of the output voltage adjustment circuit 9, comprising resistances 9a to 9e, a capacitor 9f, and a shunt regulator 9g. Also, 8a is a photodiode. The shunt regulator 9g amplifies the error between an internal reference voltage (for example, 2.5 V; not shown) and a voltage obtained by using the resistances 9a, 9b to voltage-divide the output voltage, and adjusts the current flowing in the photodiode 8a. The resistance 9c is a resistance which limits the current in the photodiode 8a, and the resistance 9d is set to a value causing the minimum necessary current to be passed on the shunt regulator 9g. Also, the resistances 9e and 9f are set to feedback constants.

That is, when the output voltage falls below a prescribed voltage, determined by the reference voltage of the shunt regulator and the ratio of the resistances 9a and 9b, the current flowing in the photodiode 8a is decreased. As a result, the current flowing in the phototransistor 8b supplied from the resistance 600a connected to the reference voltage Vref1 in FIG. 2 decreases, and the feedback voltage VFB rises. When the output voltage rises above a prescribed voltage, determined by the reference voltage of the shunt regulator 9g and the ratio of the resistances 9a and 9b, the current flowing in the photodiode 8a is increased. As a result, the current flowing in the phototransistor 8b supplied from the resistance 600a increases, and the feedback voltage VFB falls. By means of this series of operations, the output voltage is controlled so as to be constant.

Figure 4:
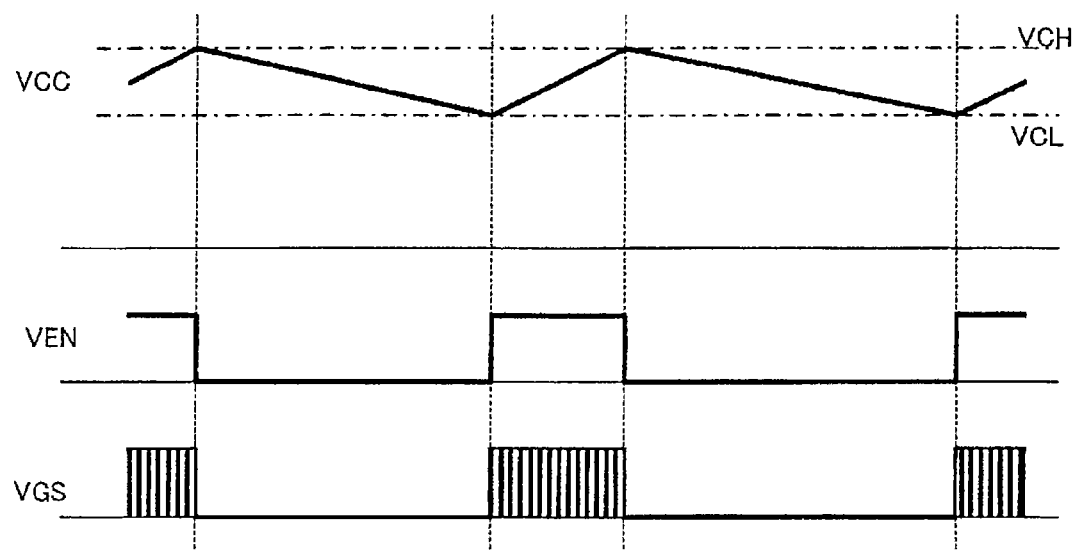
FIG. 4 is an operating waveform diagram of the control circuit of FIG. 1.

FIG. 4 is a waveform diagram used to explain the operation in FIG. 1. Below, the operation in FIG. 1 is explained referring to FIG. 2 through FIG. 3. In the normal mode in which power is supplied to the load 14, the switching signal cont1 output from the microcomputer 15 is at H level, and in standby mode in which power is not supplied to the load 14, the switching signal cont1 is at L level.

First, in standby mode cont1 is at L level, and VSTB input to the control circuit 6 is at L level. In this state, during the interval in which a gate pulse VGS is output the control power supply voltage VCC rises, and when VCC exceeds VCH, the switching-enabled signal VEN of the second control mechanism 601 goes to L level (see FIG. 4). As a result, the output of the operating mode switching mechanism 602 goes to L level, and a gate pulse VGS is no longer output.

VCC gradually falls due to the power consumption of the control circuit 6, and when the voltage value falls below VCL, VEN goes to H level. As a result, as the output of the operating mode switching mechanism 602, because a signal determined by the relative magnitudes of the feedback signal VFB and the output of the carrier generation mechanism 6c is input to logic circuit 6a by the first control mechanism 600, the gate pulse VGS is output, and VCC again rises. That is, VCC oscillates between VCH and VCL, and burst oscillation operation occurs in which, during intervals in which VCC rises the gate pulse VGS is output, while during intervals in which VCC falls the gate pulse VGS is no longer generated, so that circuit losses are reduced (see FIG. 4).

Next, in normal mode, cont1 is at H level, and VSTB input to the control circuit 6 is at H level. As the output of the OR gate 602b, because the level of the switching-enabled signal VEN remains unchanged at H level, the output signal (carrier signal) from the first control mechanism 600 is input to logic circuit 6a, and normal PWM control results. During switching between normal mode and standby mode, the output voltage V1 fluctuates, but the input voltage to the microcomputer 15 is stabilized by the voltage stabilization mechanism 16, so that erroneous operation and other problems can be avoided.

Here, by setting the threshold value VCL of the second control mechanism 601 to a value higher than the minimum operating voltage Vuv of the control circuit 6, gate pulses VGS can be output before VCC falls and the control circuit 6 stops. That is, VCC rises again before the control circuit 6 stops, so that only a small capacitance is required for the smoothing capacitor 5 connected to VCC, so that a smaller capacitor can be used.

Further, by setting the threshold value VCL of the second control mechanism 601 to a value higher than the charging restart voltage of the startup circuit 6g, gate pulses VGS can be output before VCC falls and the startup circuit begins operation. That is, VCC again rises before the control circuit 6 stops, so that losses accompanying operation of the startup circuit do not occur, and power consumption in standby can be reduced.

Further, the setting of the threshold VCH of the second control mechanism 601 is set such that gate pulses VGS are no longer output before the DC output voltage V1 reaches the output voltage setting. In normal mode, the output voltage adjustment circuit 9 of FIG. 3 decreases the current flowing in the photodiode 8a when the DC output voltage V1 falls below the output voltage setting. As a result, the current flowing in the photodiode 8b via the resistance 600a of the first control mechanism falls, the feedback voltage VFB rises, the pulse width of gate pulses VGS is broadened, and the DC output voltage V1 is caused to rise.

On the other hand, when the DC output voltage V1 rises above the output voltage setting, the current flowing in the photodiode 8a is increased, and the current flowing in the phototransistor 8b increases. Consequently the feedback voltage VFB falls, the pulse width of gate pulses VGS is decreased, and the DC output voltage V1 is made to fall. By mechanism of this operation, control is executed to hold the DC output voltage V1 constant. In standby mode, gate pulses VGS are not output before the output voltage setting is reached, and almost no current flows in the photodiode 8a, so that losses in the resistance 9c of the output voltage adjustment circuit 9 are slight, and power consumption during standby can be reduced.

Figure 5:
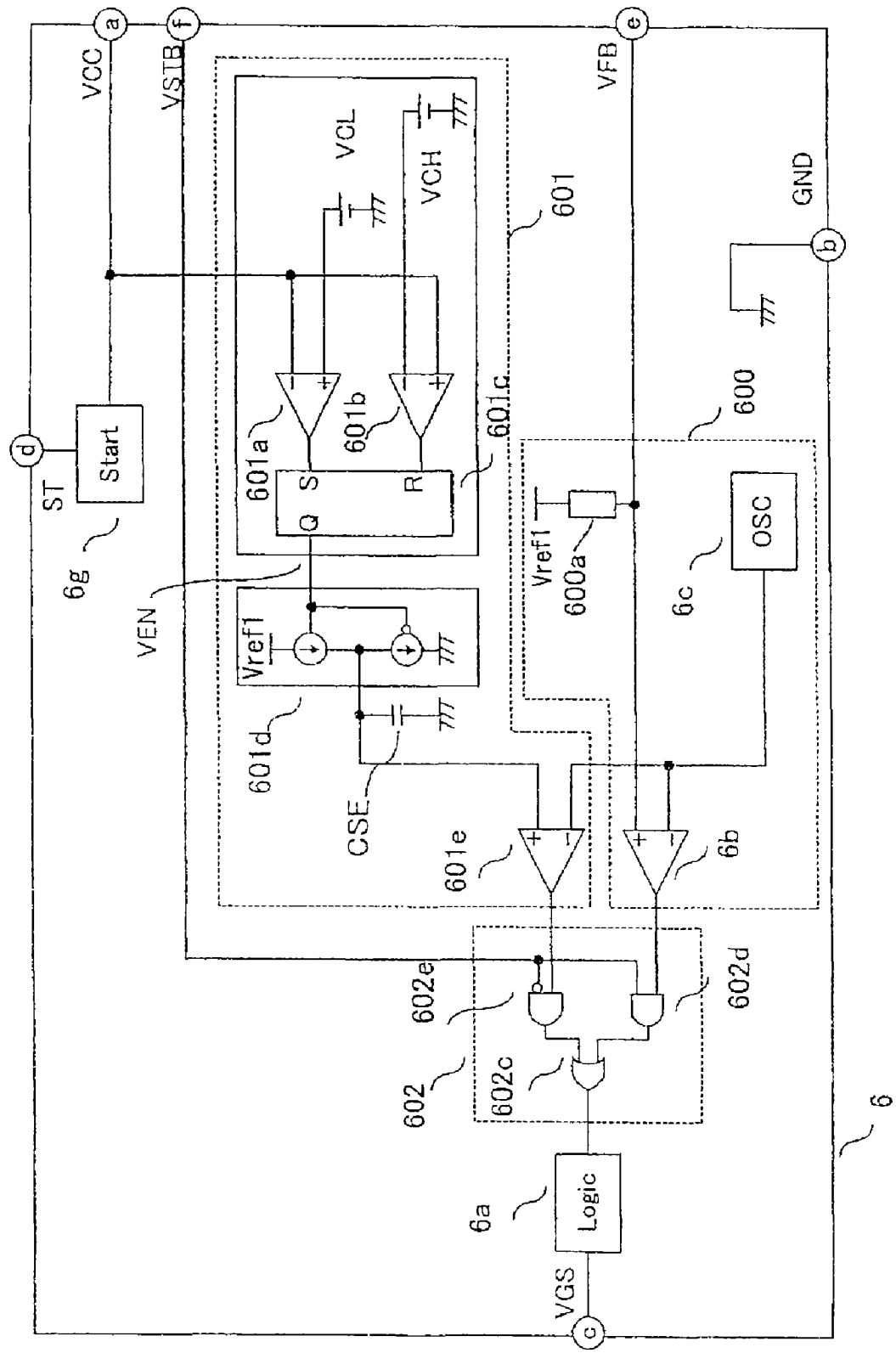
FIG. 5 is a circuit diagram showing another specific example of a control circuit.

FIG. 5 shows another specific example of a control circuit. A difference with FIG. 5 is the fact that a capacitor CSE, a charging/discharging mechanism 601d for the capacitor CSE, and a comparator 601e are added to the second control mechanism 601. By this means, the result of comparison by the comparator 601e of the relative magnitudes of the voltage on the capacitor CSE and the output signal from the carrier signal generation mechanism 6c is output as the pulse width of gate pulses VGS in standby mode.

That is, through constant-current charging of the capacitor CSE by the charging/discharging mechanism 601*d* connected to the reference voltage Vref1 with the timing with which the switching-enabled signal VEN goes to H level, the pulse width of gate pulses VGS is gradually increased when switching is started. This operation is similar to the soft-start operation of FIG. 12, and suppresses the rate of change of the excitation current flowing in the transformer 3 and reduces noise in the audible range generated by the transformer 3.

Figure 12:
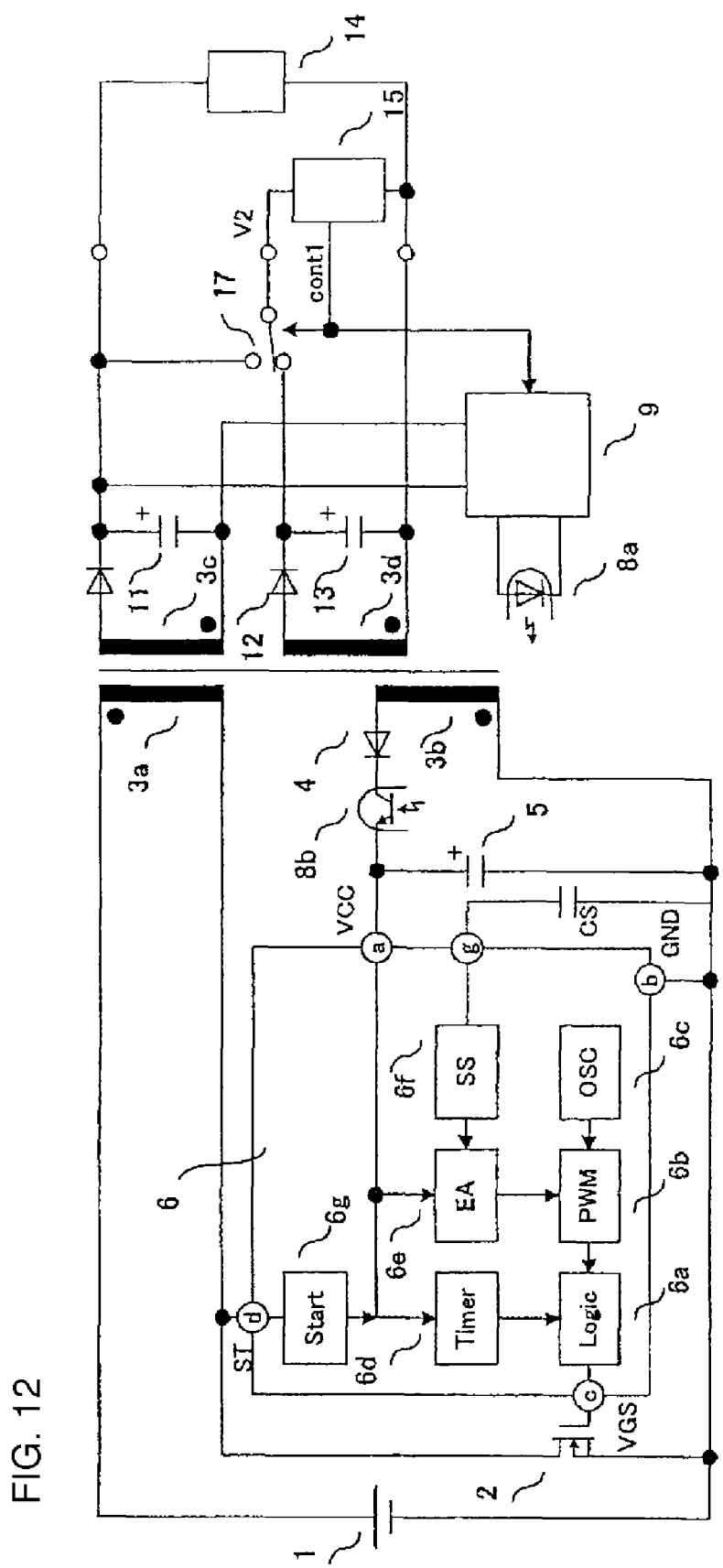
FIG. 12 shows the circuit configuration of a second example of the prior art.

A difference with FIG. 12 is that in addition to the above soft-start operation, by constant-current discharge of the capacitor CSE with the timing at which the switching-enabled signal VEN goes to L level, the pulse width of gate pulses VGS is gradually reduced. And, soft-end operation is performed in which, when the voltage on the capacitor CSE becomes substantially zero, gate pulses are no longer generated. Even when switching is halted, the rate of change of the excitation current flowing in the transformer is suppressed, so that audible noise generated from the transformer can be further reduced. By this means, audible-range noise can be lowered even without potting with varnish, and there is the further advantage that transformer costs can be reduced.

Figure 6:
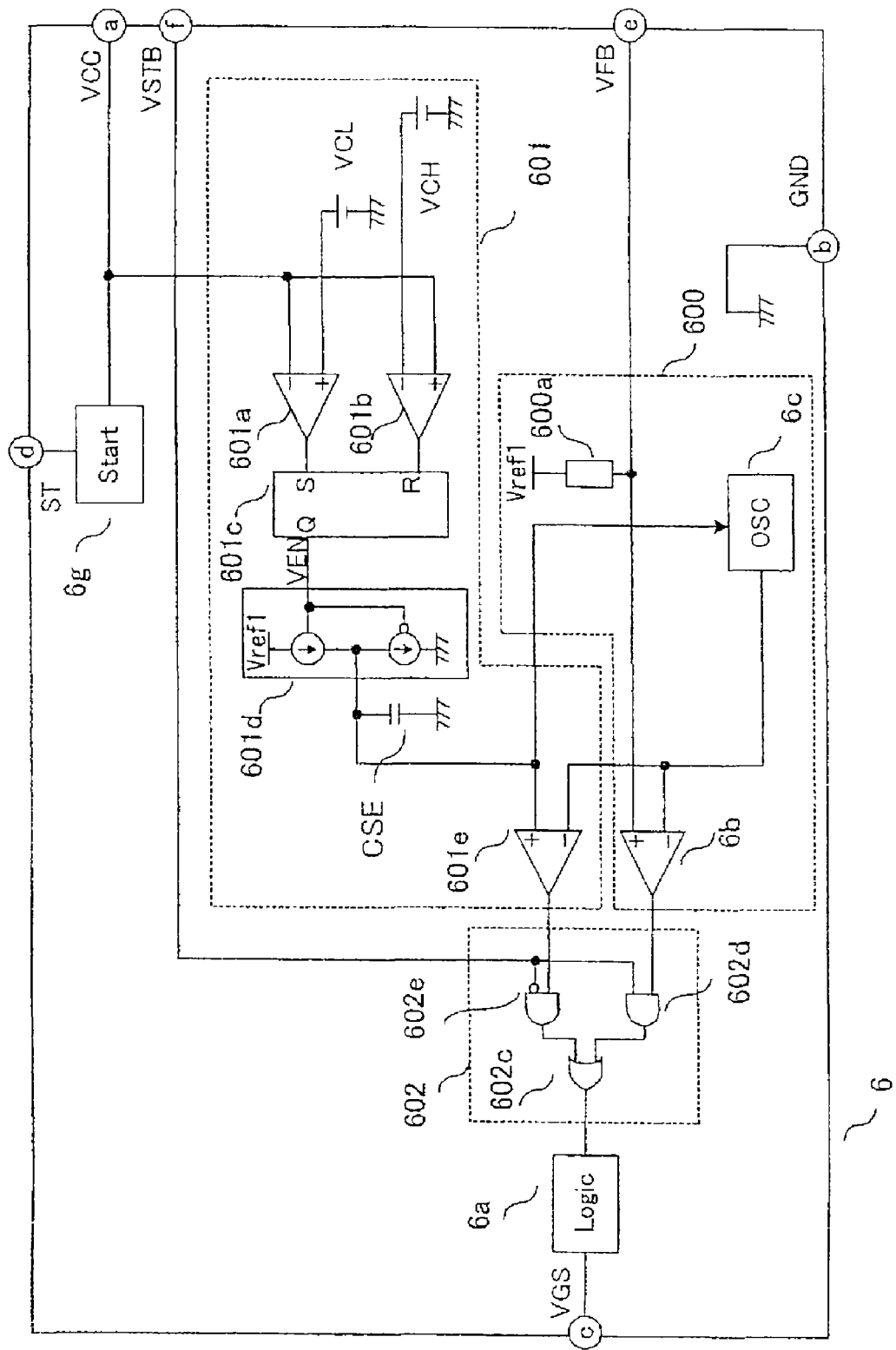
FIG. 6 is a circuit diagram showing still another specific example of a control circuit.

FIG. 6 shows still another specific example of a control circuit. A difference with FIG. 5 is the face that the carrier signal inclination is changed according to the voltage level (VCSE) of the capacitor CSE.

Figure 7A:
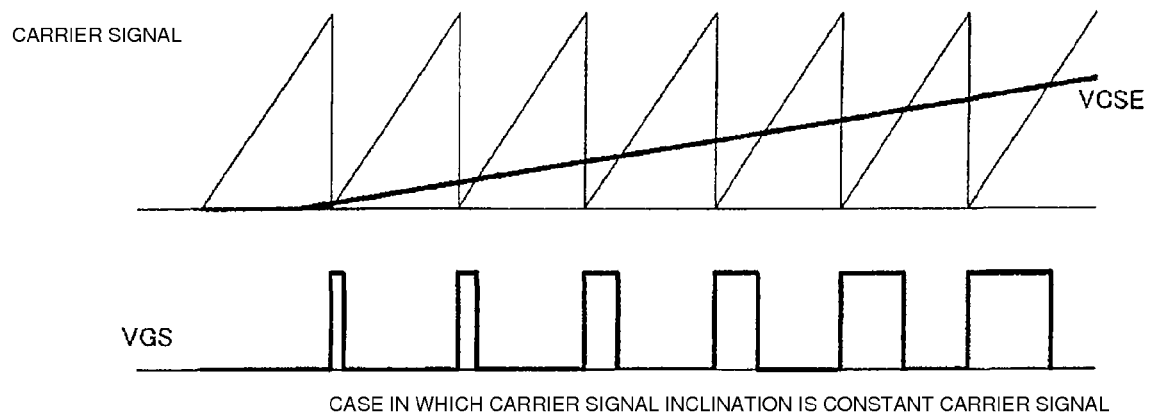
FIGS. 7A and 7B show a waveform diagram explaining operation in FIG. 6.
Figure 7B:
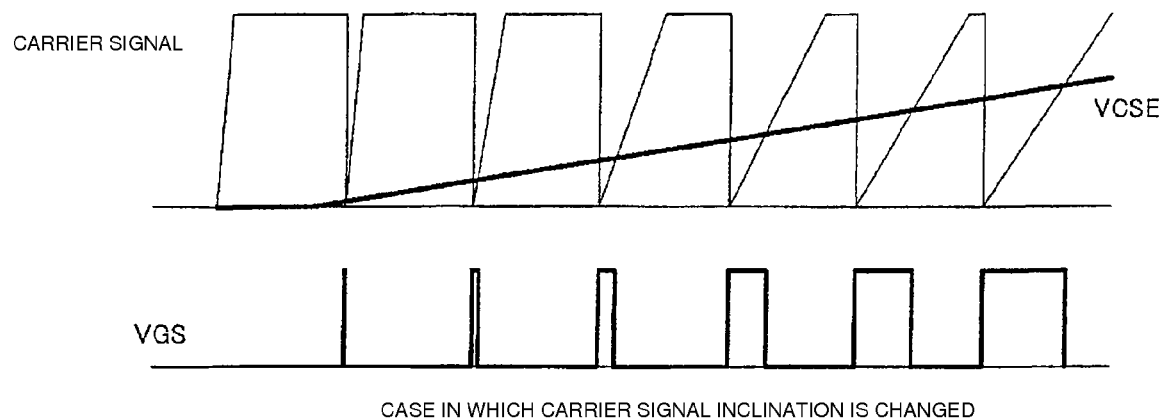

FIGS. 7A and 7B show—a waveform diagram explaining the difference in pulse widths of gate pulses VGS when the carrier signal inclination is held constant (FIG. 7A), and is changed (FIG. 7B). In the example shown in FIG. 7B, as the capacitor voltage VCSE rises, the rising inclination of the carrier signal gradually is decreased until a prescribed width.

That is, as the capacitor voltage VCSE rises, the inclination of the carrier signal gradually decreases, until the gate pulse width from the start of switching becomes short (narrow) compared with the case in which the carrier signal inclination is held fixed. As a result, audible noises generated from the transformer can be further reduced, to a level at which noises substantially cannot be heard.

Figure 8:
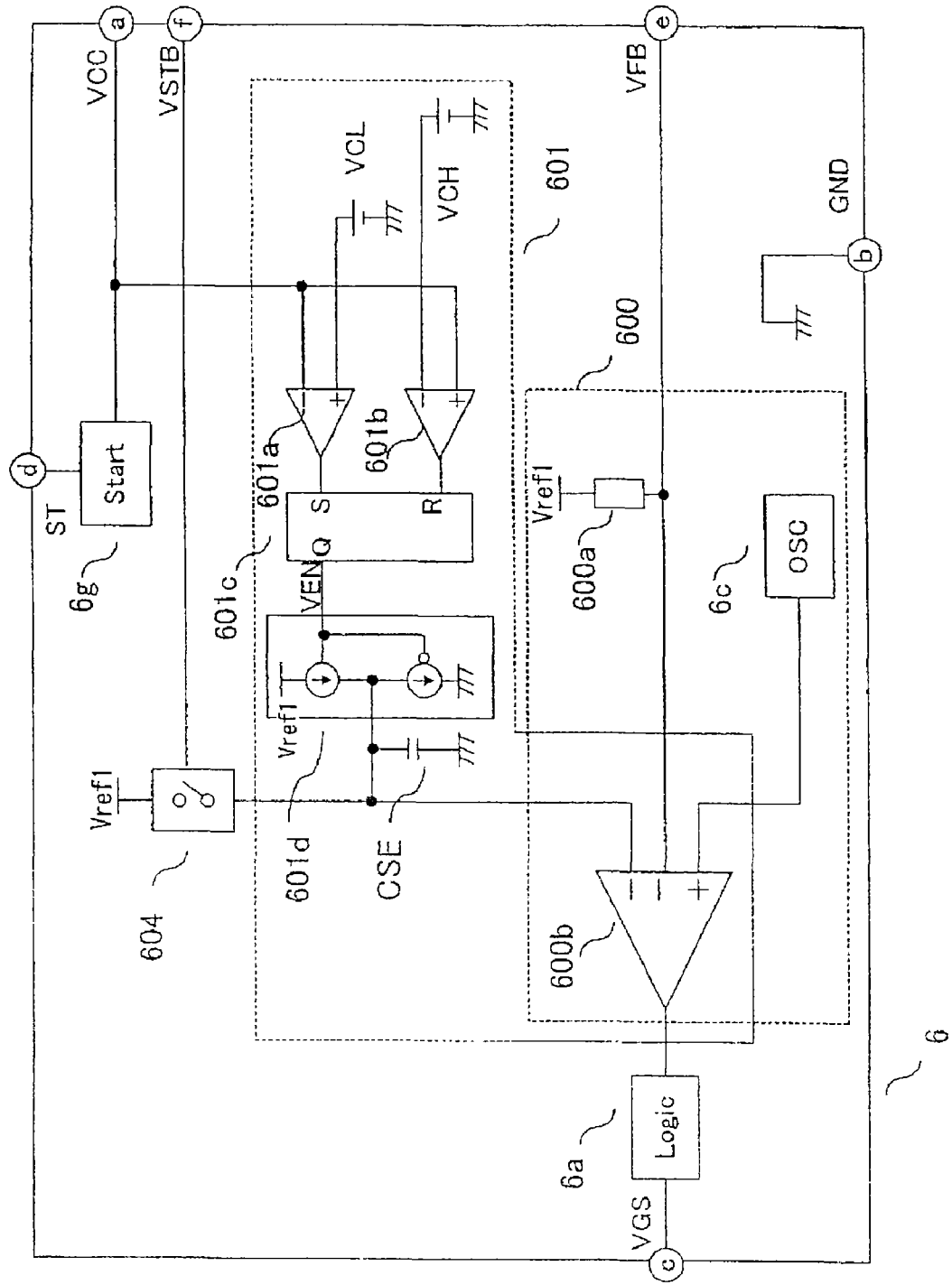
FIG. 8 is a circuit diagram showing another specific example of a control circuit.

FIG. 8 shows another specific example of a control circuit. A characteristic is that, compared with FIG. 5 and FIG. 6, a switching circuit 604 has been added. One end of the switching circuit 604 is connected to the reference voltage Vref1, which is connected to the charging/discharging mechanism 601*d* and resistance 600*a*. In FIG. 8, VSTB is at H level in normal mode, and the switching circuit 604 is turned on to fully charge the capacitor CSE to Vref1. On the other hand, in standby mode VSTB is at L level, the switching circuit 604 is turned off, and the capacitor CSE is charged and discharged based on the switching-enabled signal VEN.

Here the comparator 600*b* is a three-input type device, which compares the magnitudes of the carrier signal with the lower value among the voltage of the capacitor CSE and the feedback voltage VFB. In normal mode, by turning on the switching circuit 604 the capacitor CSE is put into the charged state up to the value of Vref1, so that the voltage is higher than the feedback voltage VFB. Consequently the result is normal PWM operation through comparison of VFB and the carrier signal in the three-input comparator 600*b*. In standby mode, because the DC output voltage V1 is set so as not to reach the output voltage setting, no current flows in the photodiode 8*a*, and the feedback voltage VFB is at Vref1. On the other hand, the voltage on the capacitor CSE is the voltage resulting from charging/discharging operation by the charging/discharging mechanism 601*d* based on the result of comparison of VCC with the threshold values VCL and VCH, and so is lower than the feedback voltage VFB. Hence the result is the above-described soft-start operation and soft-end operation. That is, separate comparators are not necessary for normal mode and for standby mode, and the operation mode switching circuit 602 can also be simplified, leading to reduced costs for the control circuit.

Figure 9:
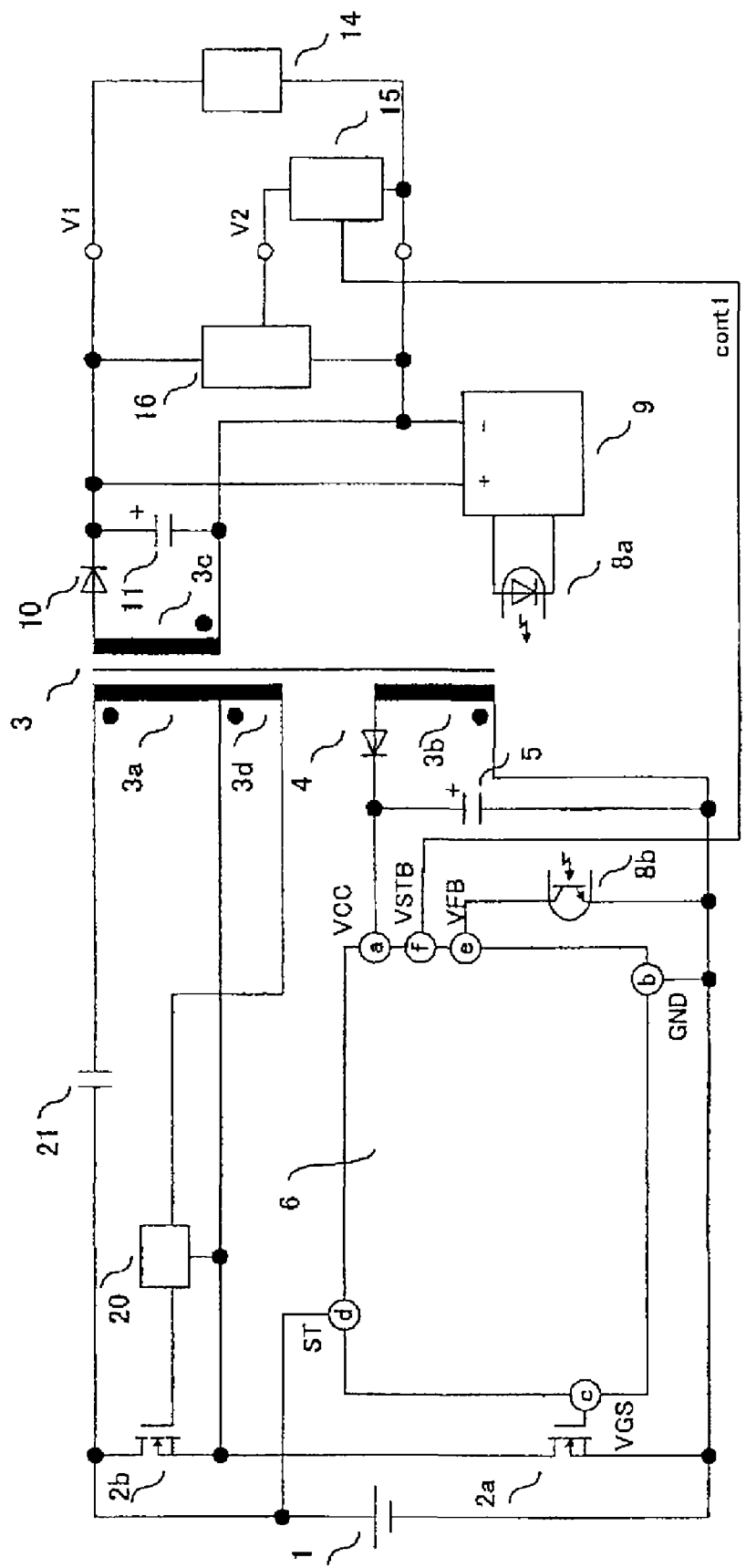
FIG. 9 is a circuit diagram showing a second embodiment of the invention.

FIG. 9 is a configuration diagram showing a second embodiment of the invention. A characteristic of this circuit is that the series circuit of switching elements 2*a* and 2*b* is connected in parallel with the DC power supply 1; by turning on and off the switching elements 2*a* and 2*b* in alternation, series resonance operation is induced in the capacitor 21 and the excitation inductance or leakage inductance of the isolation transformer 3, and resonance energy is supplied to the secondary side of the transformer (resonance-type power supply). An example is shown in which the switching element 2*b* is driven by the auxiliary windings 3*d* of the isolation transformer 3; but driving is also possible using a high-withstand voltage IC (IC: integrated circuit) and a pulse transformer.

In a resonance-type power supply such as shown in FIG. 9, a voltage from the isolation transformer 3 which has been rectified and smoothed, such as for example the DC output voltage V1 and the control circuit power supply voltage VCC, is a voltage which is substantially proportional to the windings ratio of the windings 3*b* and 3*c*, regardless of each load state. Hence there is no danger of an anomalous drop in the DC output voltage V1 to below the minimum operating voltage of the voltage stabilizing mechanism 16 and so power can be supplied with stability to the microcomputer 15. That is, by applying a control circuit 6 such as described above to such a resonance-type power supply also, entirely similar operation is possible.

The invention has been described with reference to certain preferred embodiments thereof. It will be understood, however, that modifications and variations are possible within the scope of the amended claims.

What is claimed is:

1. A switching power supply apparatus which comprises: a DC power supply;
   an isolation transformer having primary, secondary and tertiary windings; and
   a switching element in which, by turning on and off the switching element, a high-frequency voltage appearing in the secondary windings of the isolation transformer is rectified to obtain a DC output;
   a voltage-stabilizing mechanism connected to the DC output; and
   control mechanism which executes on/off control of the switching element using as a control voltage a voltage obtained by rectifying and smoothing a voltage appearing in the tertiary windings of the isolation transformer;
   wherein the control mechanism includes a first control mechanism, which compares magnitudes of a feedback signal which holds an output voltage constant and a carrier signal, and controls an on-time of the switching element, a second control mechanism which control a control power supply voltage, and an operation mode switching mechanism which selects either the first control mechanism or the second control mechanism according to a load state of the DC output; and
   wherein the second control mechanism is provided with at least one comparison mechanism which compares the control voltage with a first threshold value and a second threshold value, and when the control voltage falls below the first threshold value, a switching-enabled signal is output to enable on/off control of the switching element, but when the control voltage rises above the second threshold value, a switching-prohibited signal is output to turn off the switching element.

2. The switching power supply apparatus according to claim 1, wherein the first threshold value is set higher than the minimum operating voltage of the control mechanism.

3. The switching power supply apparatus according to claim 2, wherein the second threshold value is set such that the DC output is lower than an output voltage setting voltage.

4. The switching power supply apparatus according to claim 3, wherein the second control mechanism comprises a capacitor and charging/discharging mechanism which charges the capacitor at a constant current with a timing of output of the switching-enabled signal, and which discharges the capacitor at a constant current with the timing of output of the switching-enabled signal, and a voltage value of the capacitor is used as a turn-on pulse width value for the switching element.

5. The switching power supply apparatus according to claim 4, wherein an inclination of the carrier signal set in the first control mechanism is changed according to the voltage value of the capacitor of the second control mechanism.

6. The switching power supply apparatus according to claim 5, wherein by maintaining the capacitor of the second control mechanism in a fully-charged state, the first control mechanism can be made to operate preferentially.

7. The switching power supply apparatus according to claim 1, wherein the control mechanism comprises:
a charging mechanism to raise the control power supply voltage;
a charging interval of the charging mechanism controlled through detection signals for a prescribed charging-halt voltage and a charging-resume voltage; and
wherein the first threshold value set higher than the charging-resume voltage.

8. The switching power supply apparatus according to claim 1, wherein a switching circuit is added and one end of the switching circuit is connected to a reference voltage, which is connected to a charging/discharging mechanism and a resistance.

9. A switching power supply apparatus which comprises:
a DC power supply;
an isolation transformer having primary, secondary and tertiary windings; and
switching elements in which by connecting two switching elements in series with each other and in parallel with the DC power supply, and by turning on and off the two switching elements in alternation, a high-frequency voltage appearing in the secondary windings of the isolation transformer is rectified to obtain a DC output;
a voltage-stabilizing mechanism connected to the DC output; and
control mechanism which executes on/off control of the switching elements using as a control voltage a voltage obtained by rectifying and smoothing a voltage appearing in the tertiary windings of the isolation transformer;
wherein the control mechanism includes a first control mechanism, which compares magnitudes of a feedback signal which holds an output voltage constant and a carrier signal, and controls an on-time of the switching elements, a second control mechanism which controls the control voltage, and an operation mode switching mechanism which selects either the first control mechanism or the second control mechanism according to a load state of the DC output; and
wherein the second control mechanism is provided with at least one comparison mechanism which compares the control voltage with a first threshold value and a second threshold value, and when the control voltage falls below the first threshold value, a switching-enabled signal is output to enable on/off control of the switching elements, but when the control voltage rises above the second threshold value, a switching-prohibited signal is output to turn off the switching elements.

10. The switching power supply apparatus according to claim 9, wherein the control mechanism comprises:
charging mechanism to raise the control power supply voltage;
a charging interval of the charging mechanism controlled through detection signals for a prescribed charging-halt voltage and a charging-resume voltage; and
the first threshold value set higher than the charging-resume voltage.

11. The switching power supply apparatus according to claim 10, wherein the second threshold value is set such that the DC output is lower than an output voltage setting voltage.

12. The switching power supply apparatus according to claim 11, wherein the second control mechanism comprises:
a capacitor; and
charging/discharging mechanism which charges the capacitor at a constant current with a timing of output of the switching-enabled signal, and which discharges the capacitor at a constant current with the timing of output of the switching-enabled signal, and a voltage value of the capacitor is used as a turn-on pulse width value for the switching element.

13. The switching power supply apparatus according to claim 12, wherein an inclination of the carrier signal set in the first control mechanism is changed according to the voltage value of the capacitor of the second control mechanism.

14. The switching power supply apparatus according to claim 13, wherein, by maintaining the capacitor of the second control mechanism in a fully-charged state, the first control mechanism can be made to operate preferentially.

15. The switching power supply apparatus according to claim 14, wherein the first threshold value is set higher than the minimum operating voltage of the control mechanism.

* * * * *